(No Model.)
I. V. PUTERBAUGH.
MACHINE FOR CLEANING AND GRADING POTATOES.
No. 313,105. Patented Mar. 3, 1885.
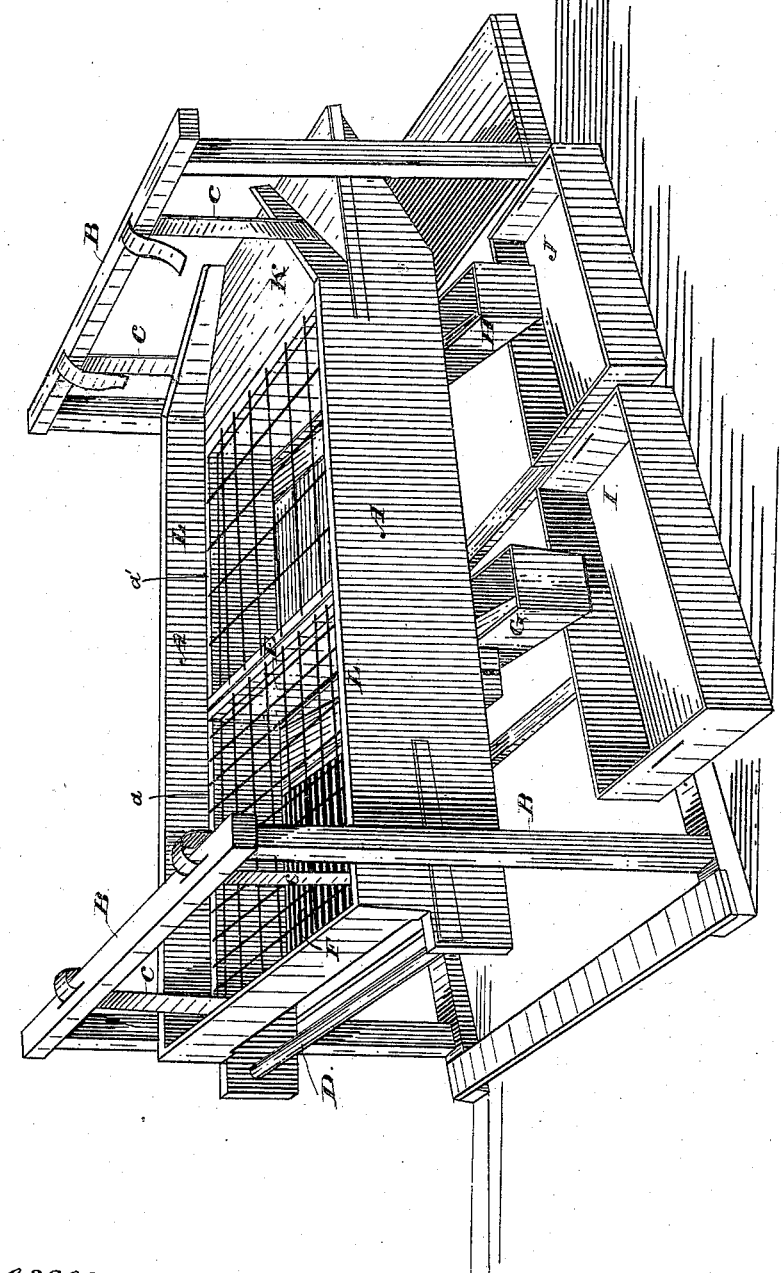
Witnesses.
John G. Ridout
Chas. C. Baldwin
Inventor.
Isaac Von Puterbaugh
by
Donald C. Ridout & Co.
Attys

UNITED STATES PATENT OFFICE.

ISAAC V. PUTERBAUGH, OF VAUGHAN, ONTARIO, CANADA.

MACHINE FOR CLEANING AND GRADING POTATOES.

SPECIFICATION forming part of Letters Patent No. 313,105, dated March 3, 1885.

Application filed July 7, 1884. (No model.) Patented in Canada June 25, 1884, No. 19,643.

*To all whom it may concern:*

Be it known that I, ISAAC VAN PUTERBAUGH, of the township of Vaughan, in the county of York, in the Province of Ontario, Canada, have invented certain new and useful Improvements in Machines for Cleaning and Grading Potatoes, of which the following is a specification.

The object of the invention is to devise a machine for sifting the soil from potatoes, and at the same time separate them into three grades of potatoes—namely, potatoes fit only for feed; secondly, potatoes fit for seed; and, thirdly, marketable potatoes; and it consists, essentially, of a frame or shoe flexibly supported from a frame and divided into two compartments separated by a partition, and having netting graded, as hereinafter described, secured to frames, which rest on top of the shoe with a grated bottom placed at the bottom of one of the compartments, substantially as hereinafter more particularly explained and claimed.

The drawing represents a perspective view of my improved machine.

A is the frame or shoe, shaped substantially as shown, and flexibly supported from the main frame B by the flexible hangers C.

D is a rod attached to extensions of the shoe, serving both as a brace and as a handle for the operator to seize in order to impart a reciprocating longitudinal movement to the frame or shoe A. This frame or shoe is divided into two compartments by the partition E, the compartment nearest to the handle D having a grated bottom, F, while the compartment farthest from the handle D has a close board bottom. A spout, G, leads from the compartment nearest to the handle, while the spout H extends into and leads from the other compartment. There is a hole near the outer end of each of these spouts G and H, immediately over the trays I and J, so that anything which gets from the compartment into the spout G will be discharged into the tray I, while anything which finds its way into the spout H will be discharged into the tray J. The top of the shoe A is covered with netting, secured to two frames, *a a'*, resting on top of the shoe, and supported at their junction by the partition E. This arrangement permits of the easy removal of the netting for repairs, or of the substitution of differently-meshed netting, according to the size of the potatoes to be separated, the netting over the grated bottom F being a finer mesh than the netting over the other compartment, the netting over the grated bottom having a mesh sufficiently large to allow the dirt and small potatoes, fit only for feed, to fall through it onto the grated bottom F, whereas the netting over the other compartment is of a larger mesh, so that potatoes suitable for seed may drop through it, but of too fine a mesh to allow such potatoes as are suitable for market to fall through.

The effect of a machine constructed in this manner is that the soil which may be gathered with the potatoes when they are dug is thoroughly separated from them, and the potatoes are thus graded, as will be understood from the following explanation of the operation of the machine: The potatoes are first thrown onto the fine netting over the grated bottom F, which netting permits the earth and very small potatoes to fall through it, while the larger potatoes remain on top. The small potatoes in falling on the grated bottom F become separated from the earth which has fallen through with them, as the earth passes through the grated bottom F, leaving the small potatoes on the said bottom, which potatoes, as the shoe A derives a reciprocating shaking motion, are shaken toward the spout G, falling through it into the tray I, where they may be removed and used for feed. As the operator continues to shake the shoe A the seed-potatoes and large marketable potatoes roll toward the other end of the shoe, and when they reach the netting over the next compartment the seed-potatoes fall through, while the large potatoes continue moving toward the spout K, at the end of the shoe B, where they are discharged into trays or other receptacles, by which they may be removed, the seed-potatoes falling through the netting onto the bottom of the shoe below it, where they finally find their way into the spout H, and thence into the tray J.

I do not confine myself to any particular dimensions, nor do I limit myself to the use of any particular material; but I may mention that the distance from the netting on the top of the shoe A to the bottom of the shoe should be sufficient to allow a perfect separation between the potatoes which remain on top and the potatoes and dirt which fall through. The size of the netting may also be altered to suit the particular kind of potatoes being sifted and graded. I should also mention that it would be advisable to form sides L around the top of the shoe, so as to prevent the potatoes being graded from falling off the edges.

What I claim as my invention is—

The herein-described machine for cleaning and grading potatoes, consisting of the main frame B, shoe A, flexibly supported on said main frame, the partition E, dividing said shoe into two separate compartments, the sieve-frames $a\ a'$, carrying netting graded as described and resting on the top of the shoe and extending in the same plane over each compartment, and the sides L, projecting above said sieve-frame, and inclined toward each other at the end to form a spout, K, as set forth.

Toronto, June 13, 1884.

ISAAC V. PUTERBAUGH.

In presence of—
   CHARLES C. BALDWIN,
   F. BARNARD FETHERSTONHAUGH.